May 16, 1967 — H. L. PATRY ETAL — 3,319,330
METHOD OF MANUFACTURING AN EXPANSION JOINT COVER
Filed Feb. 5, 1964 — 17 Sheets-Sheet 1
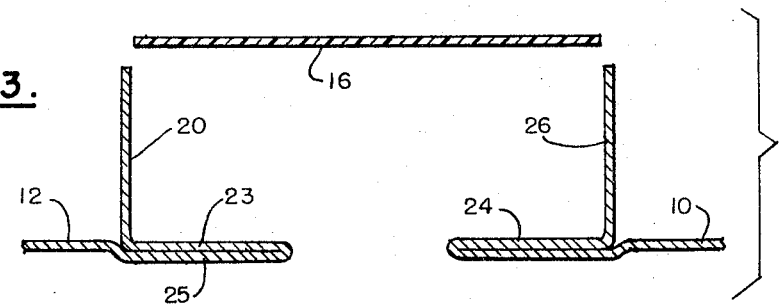
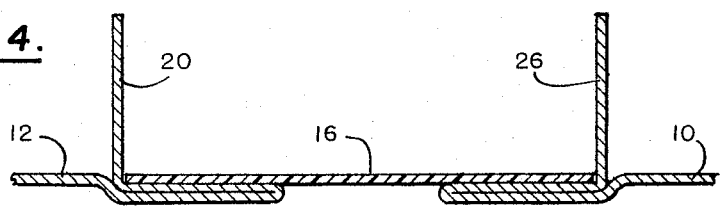
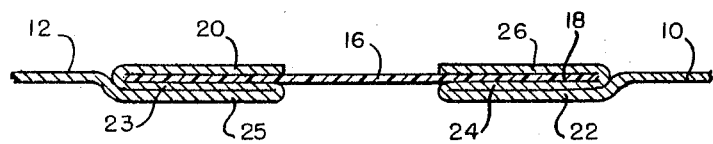
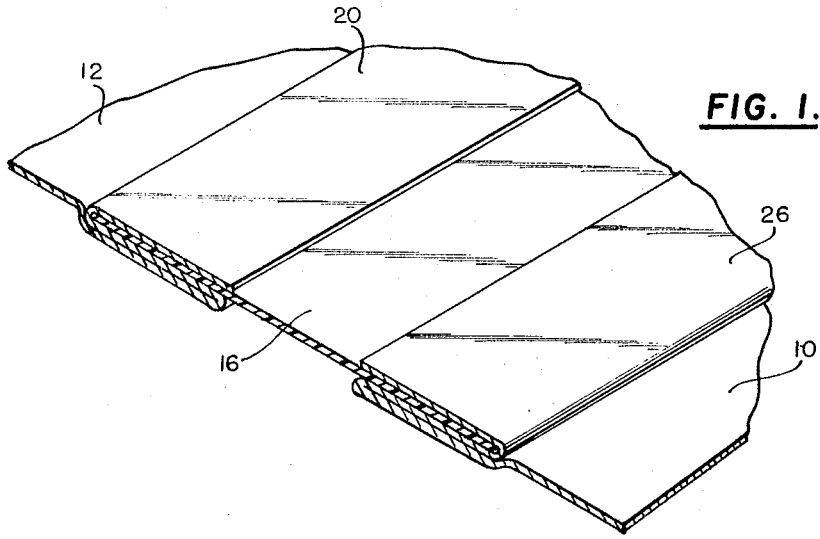
INVENTORS
Harvey L. Patry
Frances J. Patry
Ernest Patry
H. Blair Lamont
BY Moore, Hall & Pollock
ATTORNEYS

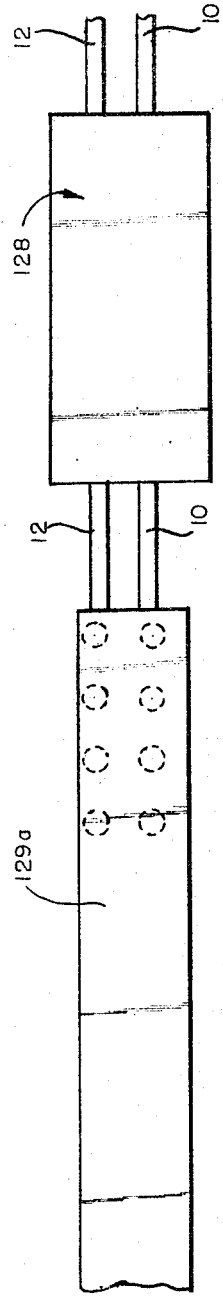

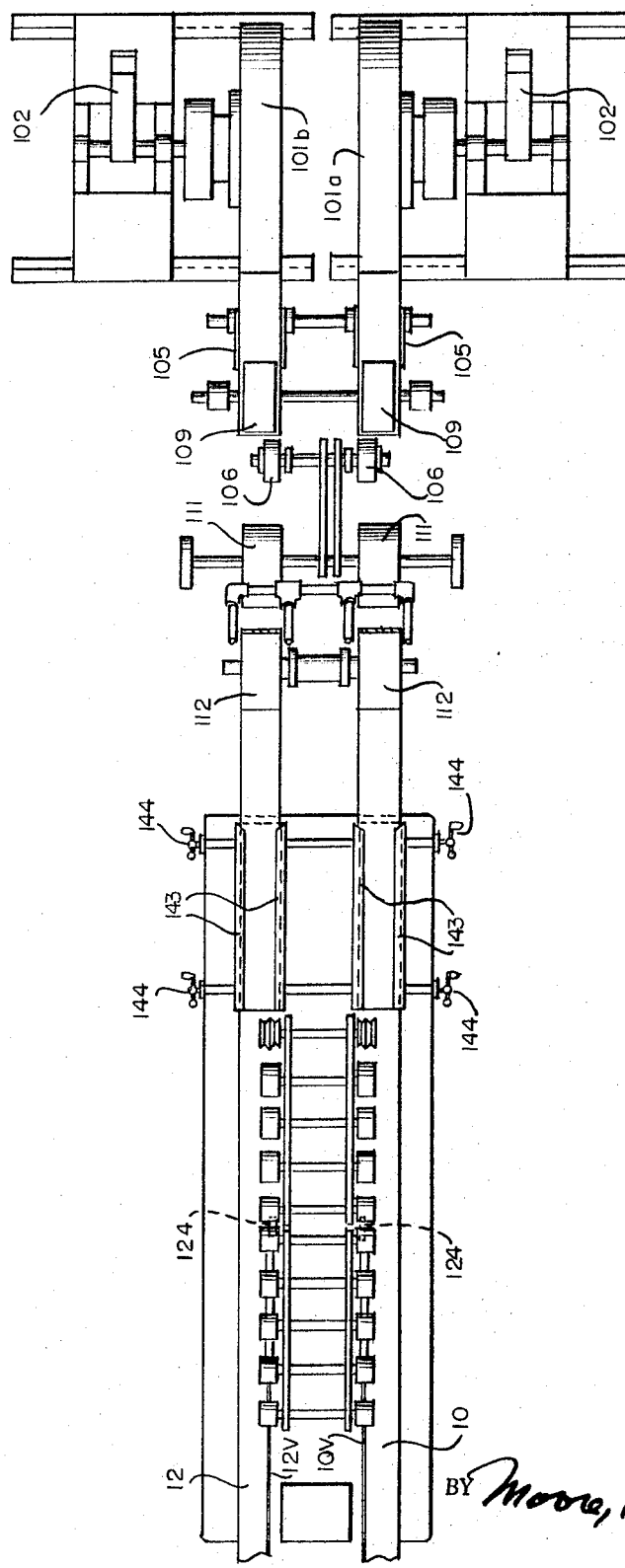

May 16, 1967 H. L. PATRY ETAL 3,319,330
METHOD OF MANUFACTURING AN EXPANSION JOINT COVER
Filed Feb. 5, 1964 17 Sheets-Sheet 4

INVENTORS
Harvey L. Patry
Frances J. Patry
Ernest Patry
H. Blair Lamont
BY Moore, Hall & Pollock
ATTORNEYS

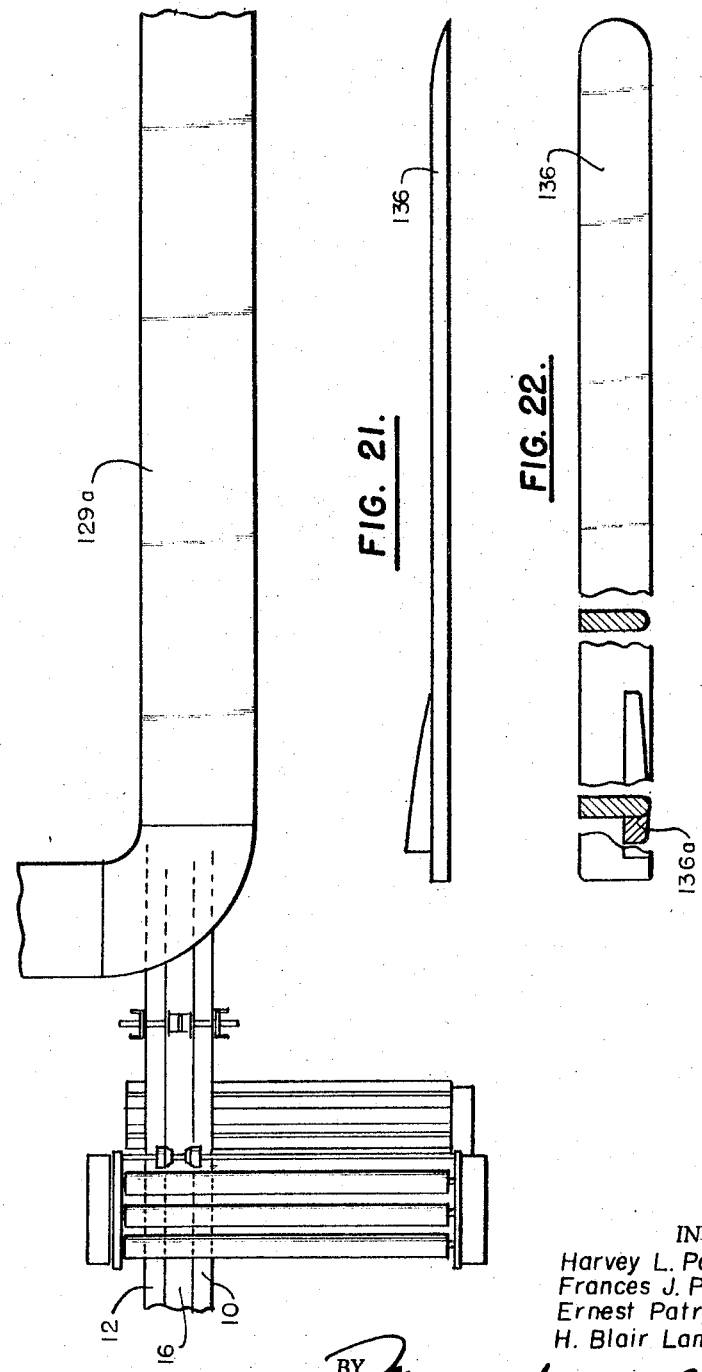

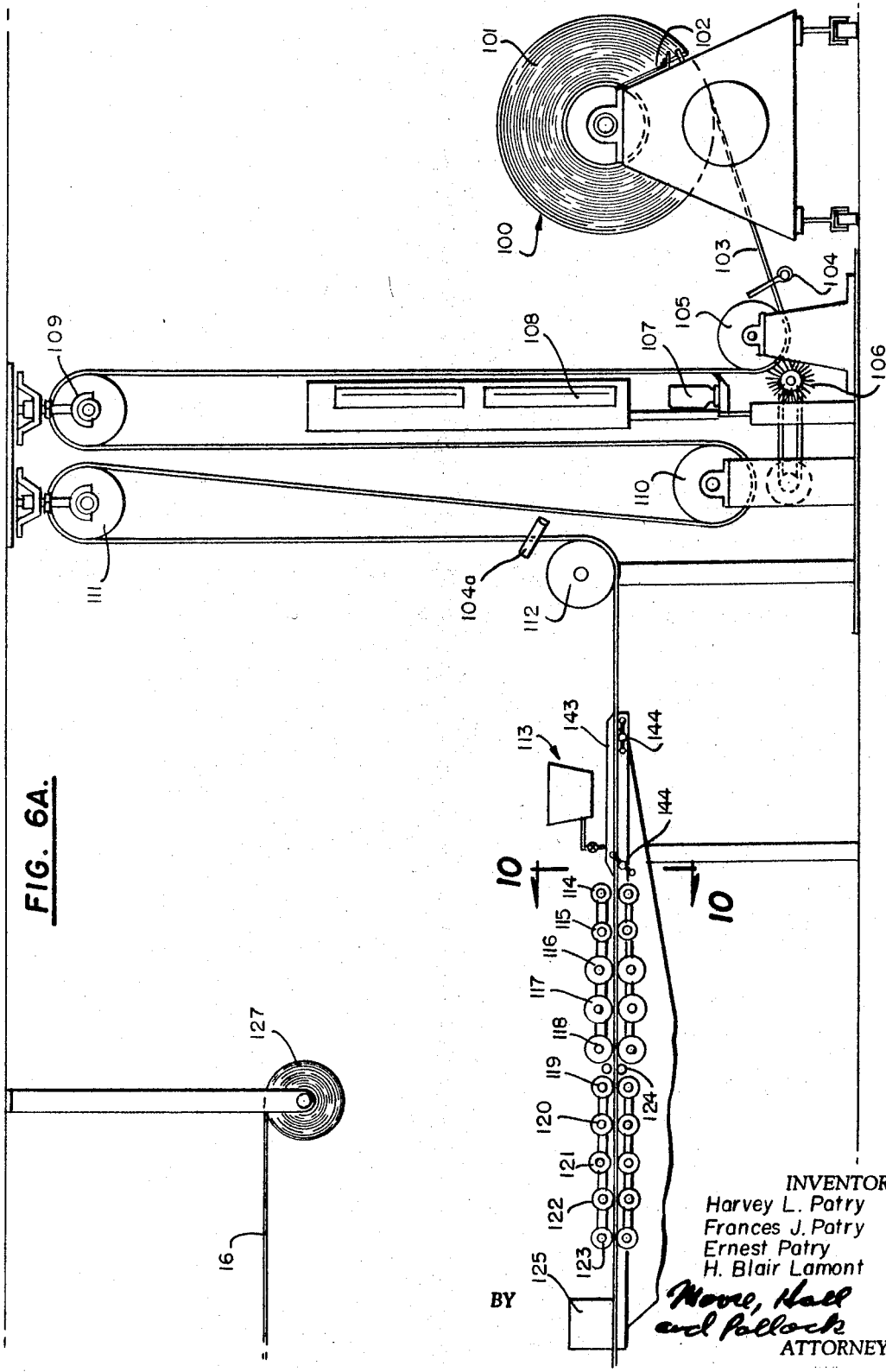

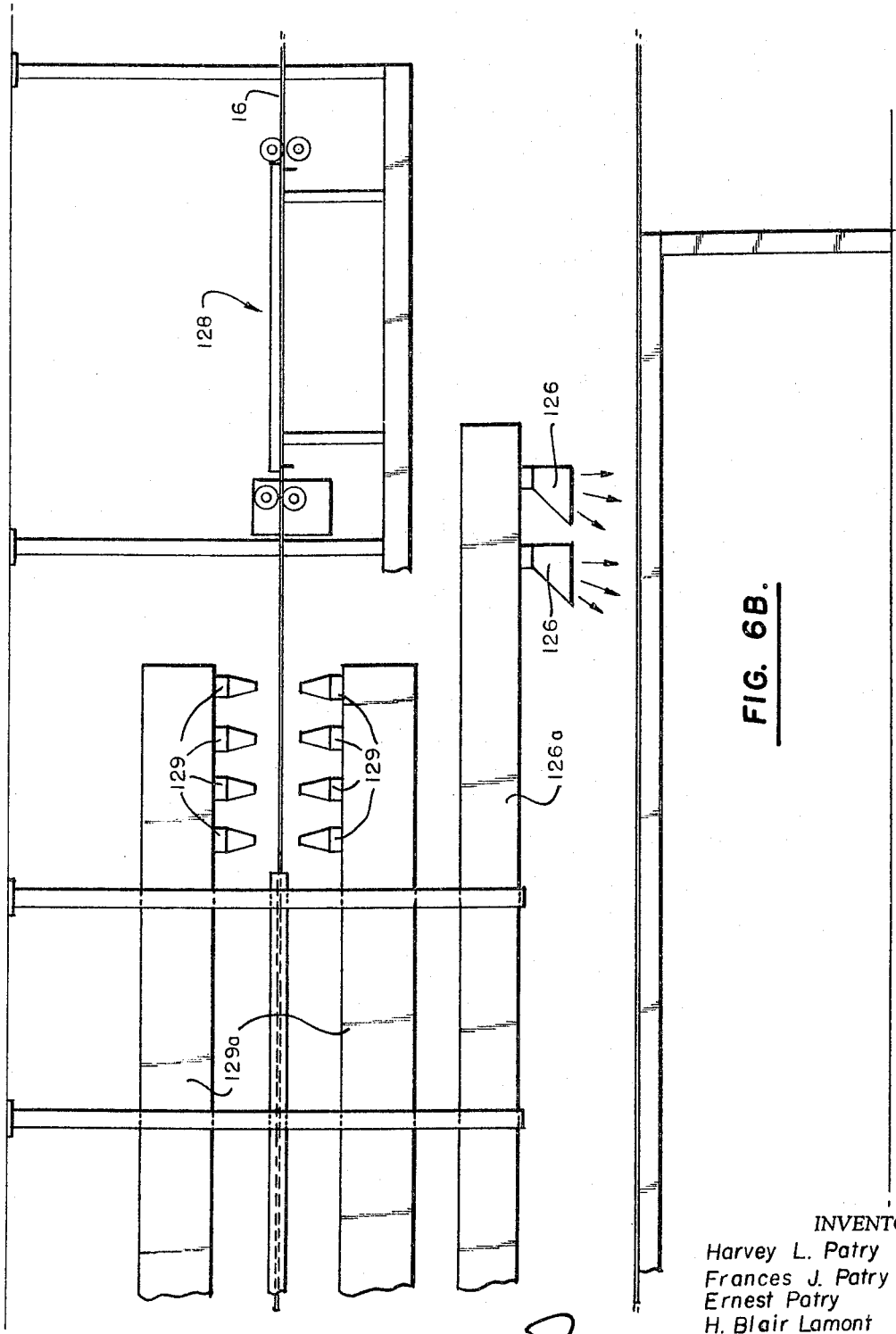

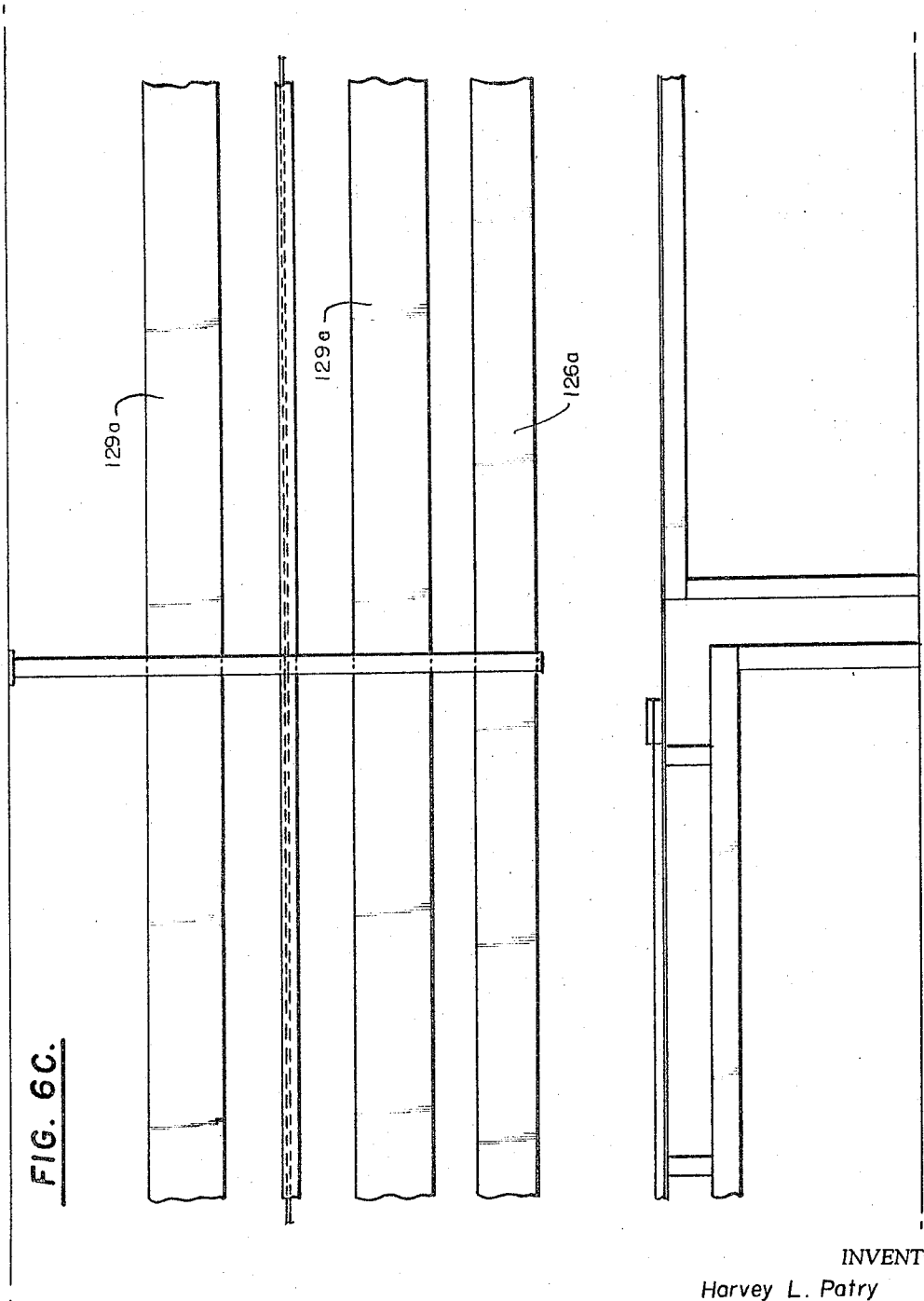

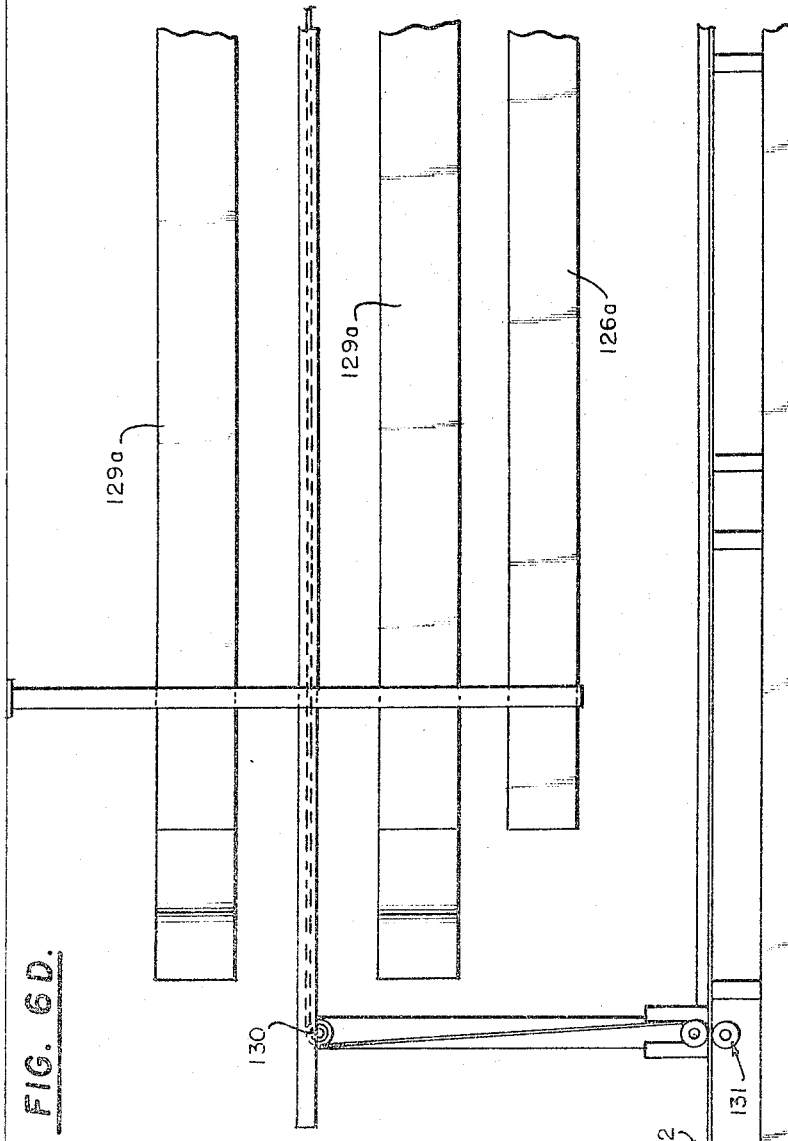

INVENTORS
Harvey L. Patry
Frances J. Patry
Ernest Patry
H. Blair Lamont

ATTORNEYS

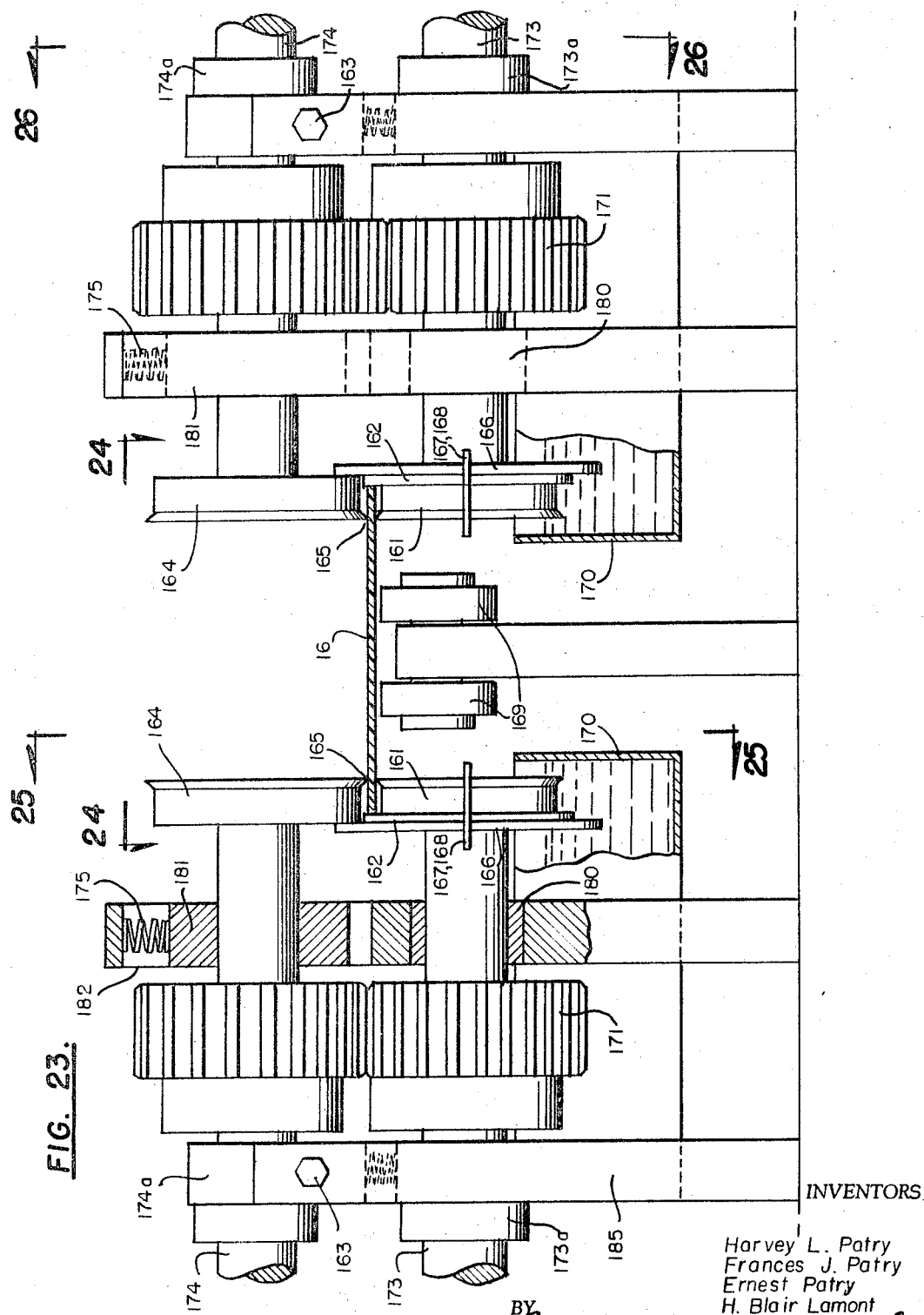

May 16, 1967  H. L. PATRY ETAL  3,319,330
METHOD OF MANUFACTURING AN EXPANSION JOINT COVER
Filed Feb. 5, 1964  17 Sheets-Sheet 13
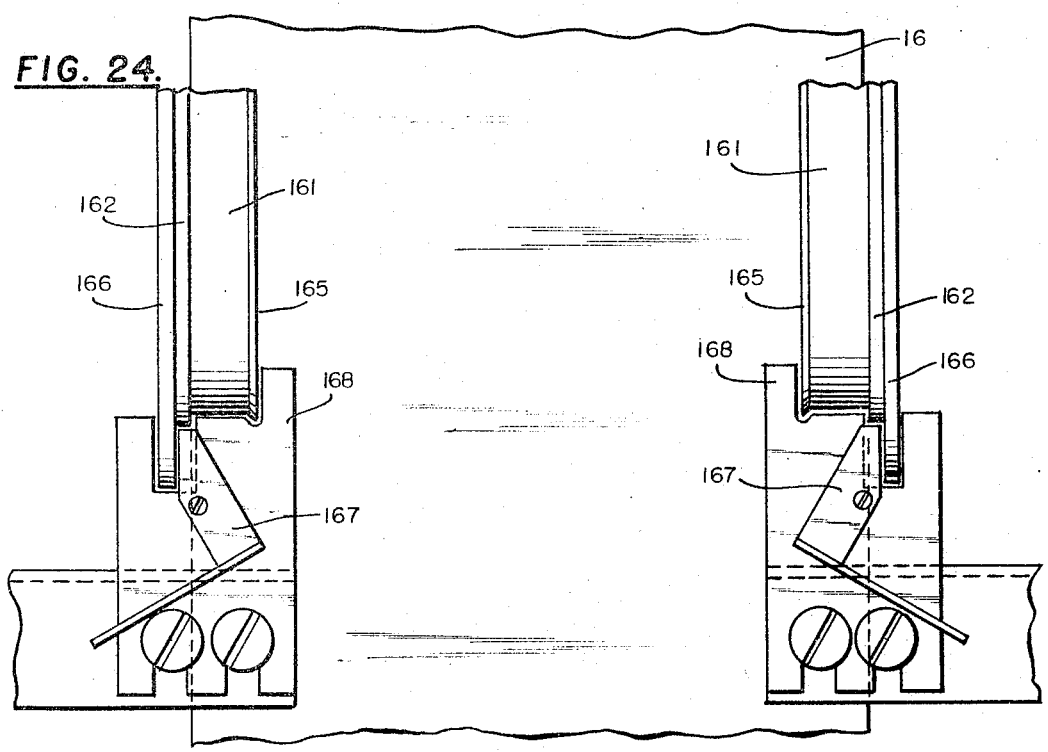
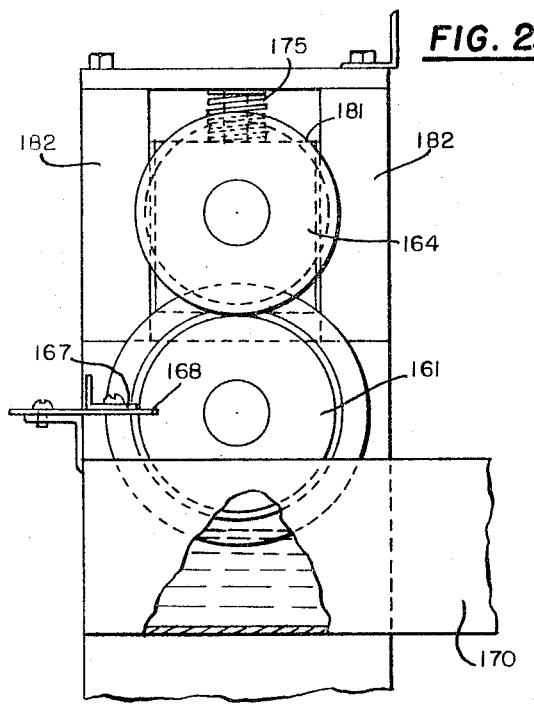
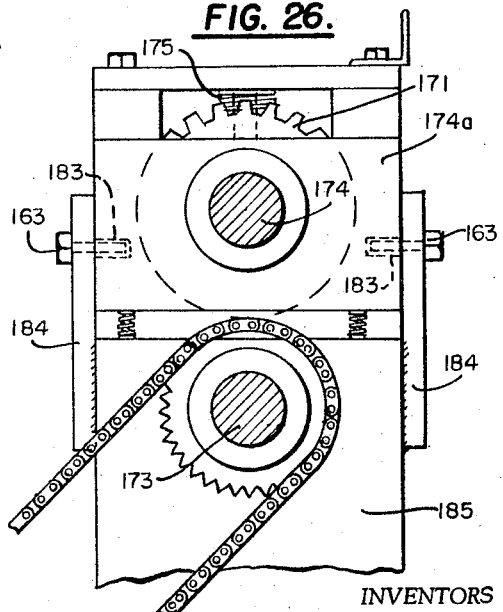
INVENTORS
Harvey L. Patry
Frances J. Patry
Ernest Patry
H. Blair Lamont
BY Moore, Hall & Pollock
ATTORNEYS

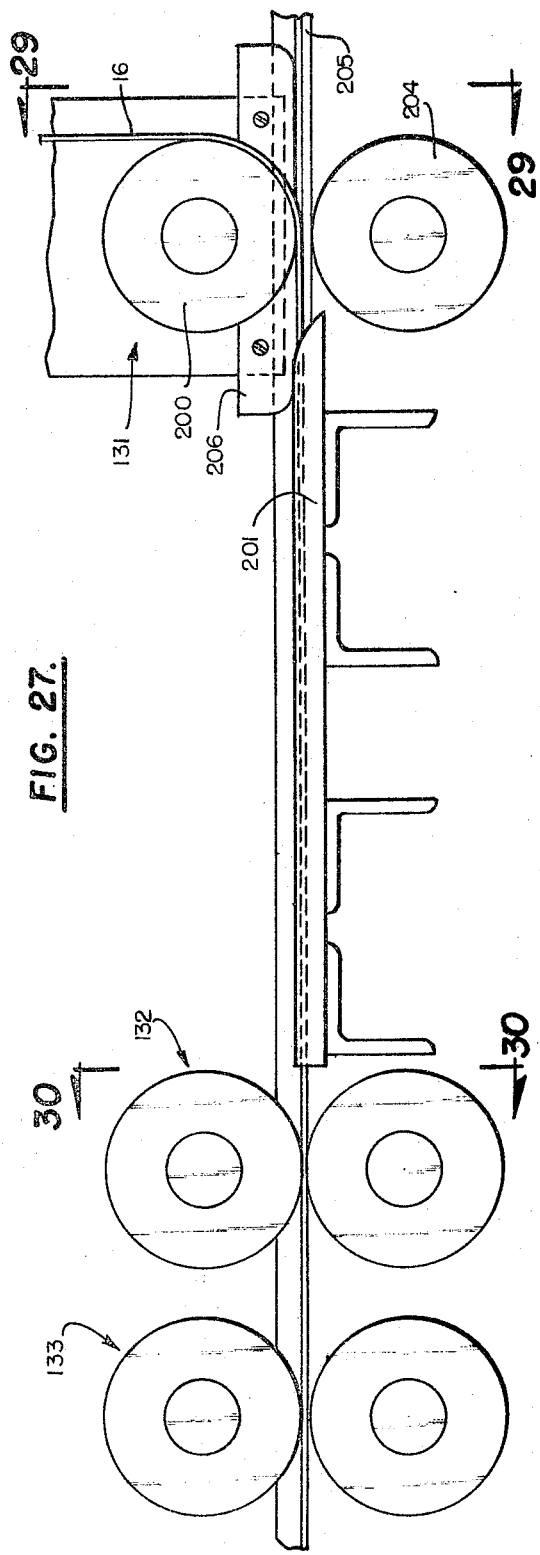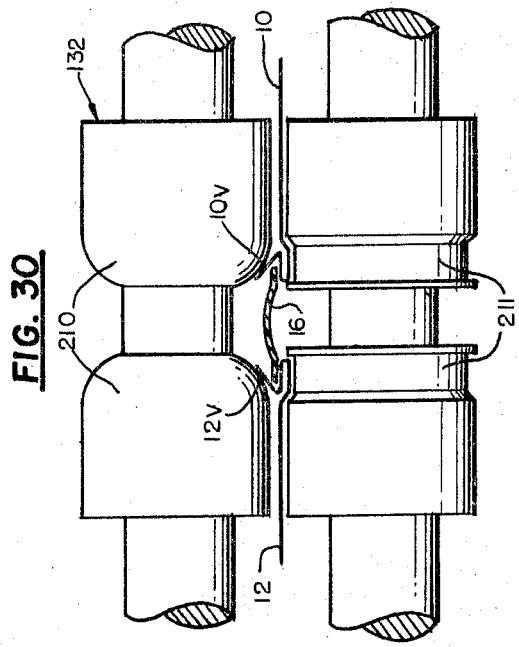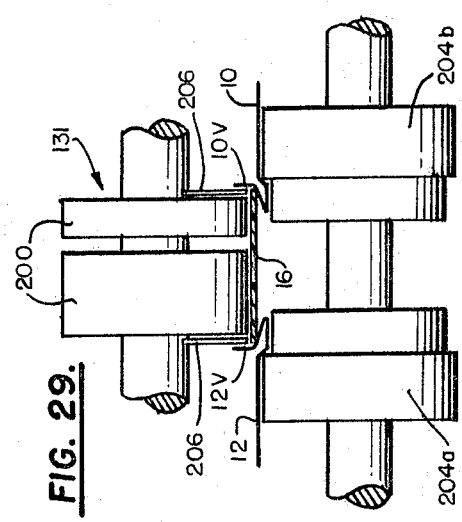

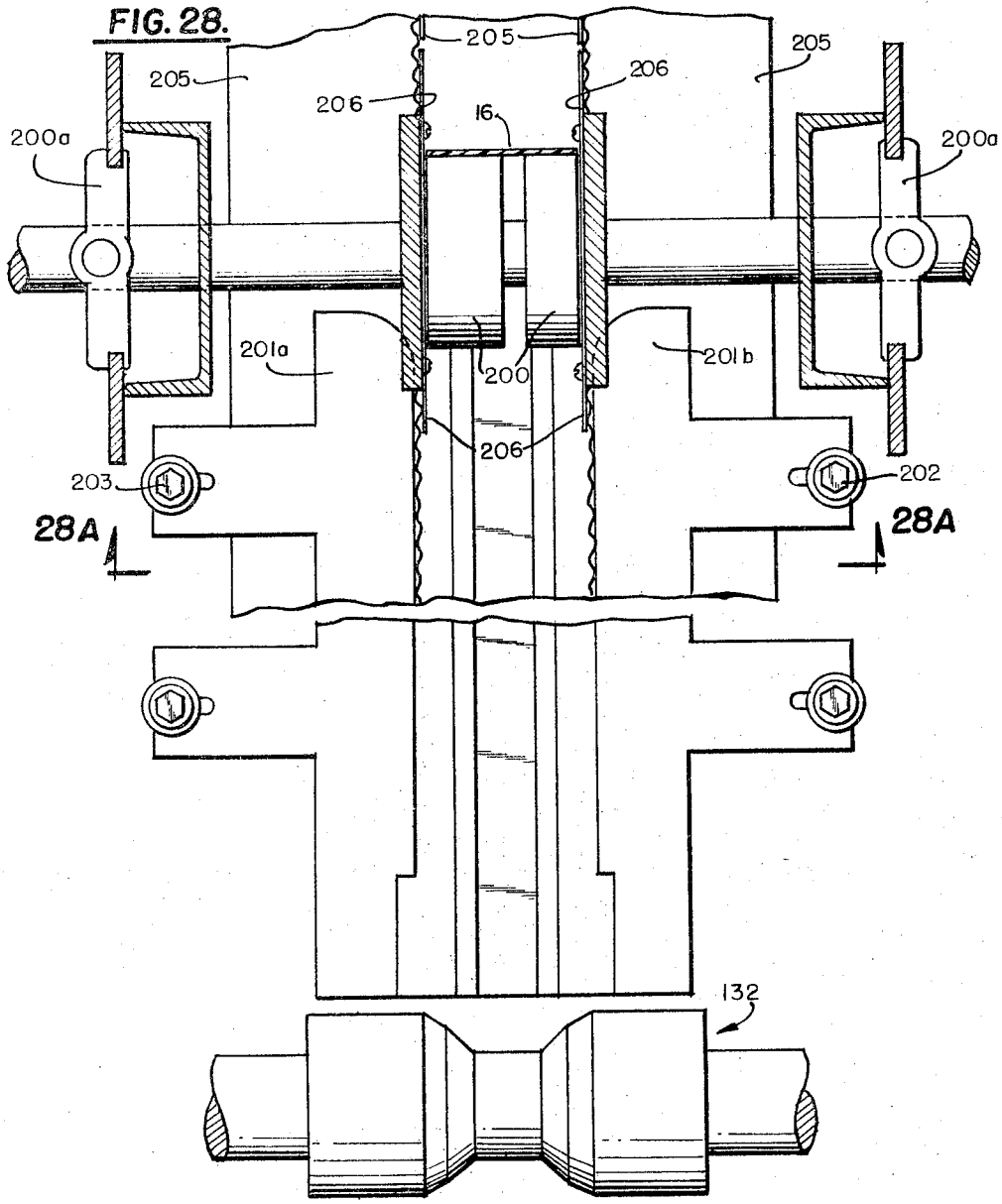

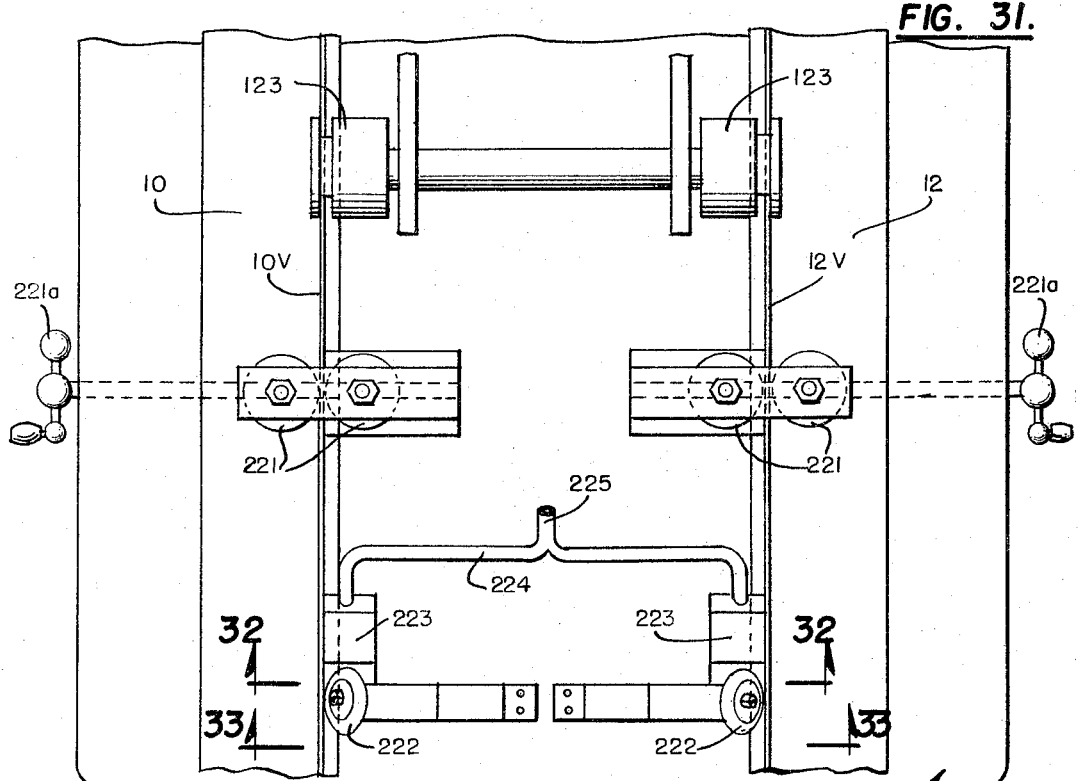
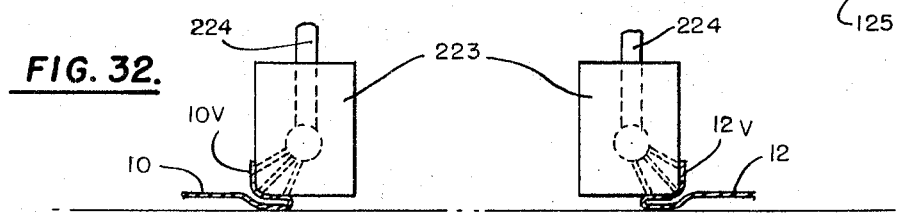
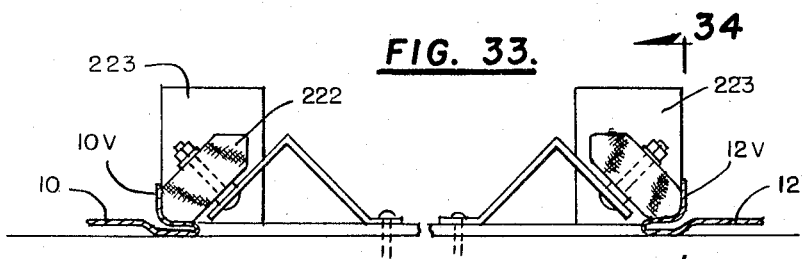
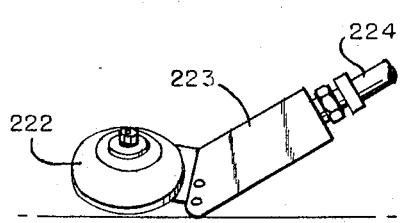

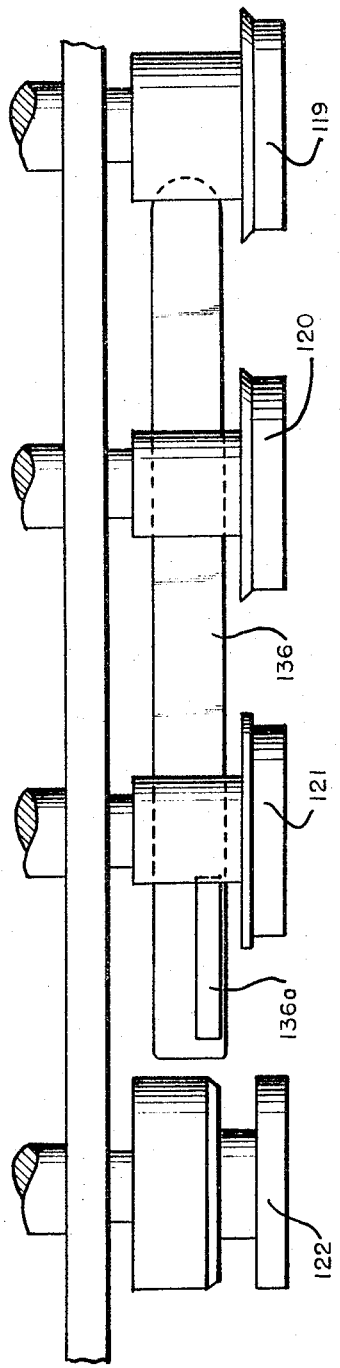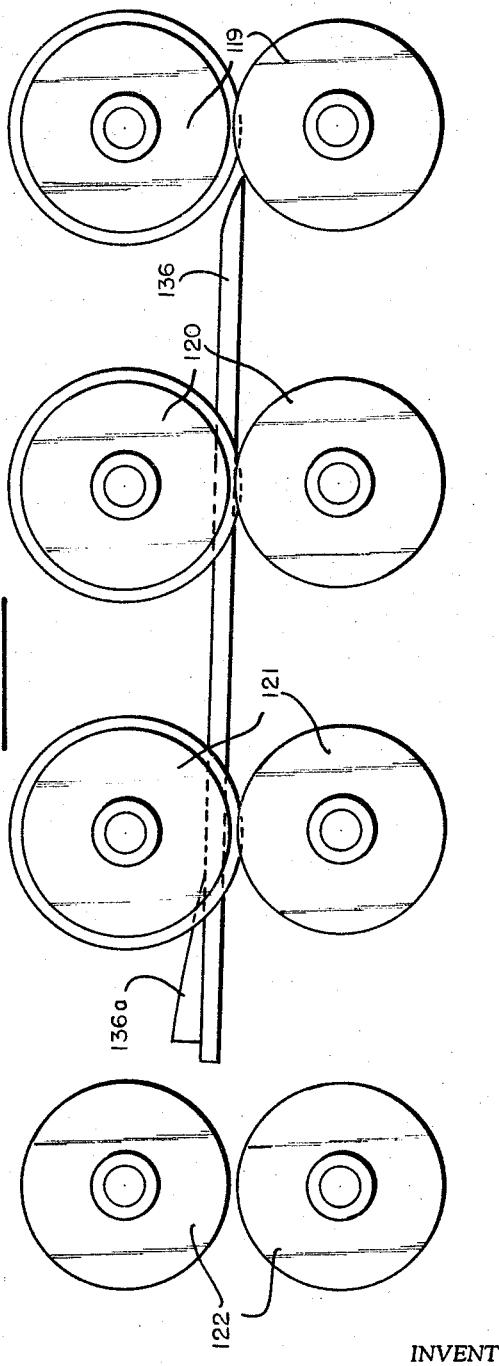

United States Patent Office 3,319,330
Patented May 16, 1967

3,319,330
METHOD OF MANUFACTURING AN
EXPANSION JOINT COVER
Harvey L. Patry, Francis J. Patry, and Ernest Patry, Lewiston, and Harold Blair Lamont, Lincolnville, Maine, assignors to Lamont & Riley, Inc., Worcester, Mass., a corporation of Massachusetts
Filed Feb. 5, 1964, Ser. No. 342,766
4 Claims. (Cl. 29—430)

This invention relates to a method of manufacturing an expansion joint cover of the type often used in buildings and elsewhere. The expansion joint cover has been made the subject of a prior copending application of the present inventors, Ser. No. 72,179, filed Nov. 28, 1960, entitled, "Expansion Joints for Metal Panels," now United States Patent No. 3,123,188 granted, Mar. 3, 1964.

A primary object of this invention is to provide an improved method of manufacturing the aforesaid type of expansion joint cover.

Another object of this invention is the provision of a method of manufacturing an expansion joint cover at low cost.

Still another object of this invention is the provision of a method of joining metal strips to elastic members in a simple and efficient manner.

Another object of this invention is to provide a method of bending metal elements to a particular shape and then joining them to an elastic member.

Other objects of the invention will become apparent as this description proceeds.

Briefly speaking, the invention provides a method of producing two metal strips and feeding them side by side in parallel paths. During this feeding operation the strips are bent so that each has an elongated vertical portion connected at its lower end to an elongated horizontal portion. In addition there is a horizontal base portion whereby the two strips have a cross section as shown in FIGURE 3 of the drawings. An elongated strip of elastic material is fed on to the first-named horizontal portions but only after a suitable adhesive has been applied to the several portions of the various strips which will ultimately be brought into contact with each other.

The elastic strip is bonded to said first-named horizontal portions by means of suitable rolls, and in this connection vertical guides are employed for guiding the elastic material so as to prevent the lower portion of the elastic material from coming into contact with and adhering to the vertical portions of the first-named metal strips.

At a later time the aforesaid vertical portions of the two strips are bent down so as to clamp the elastic material between said vertical portions and the first-named horizontal portions.

The method and machine will be described in more detail in conjunction with the following drawings.

In the drawings:

FIGURE 1 is a perspective view of an expansion joint of the type described in the aforesaid prior copending application, and is the expansion joint which is manufactured by the method and machine described in the present application.

FIGURE 2 is a cross-sectional view of the expansion joint cover of FIGURE 1.

FIGURE 3 shows one of the steps involved in making the expansion joint of FIGURE 2.

FIGURE 4 is a cross-sectional view showing another step in the manufacture of the expansion joint cover of FIGURE 2.

Figure 5C:
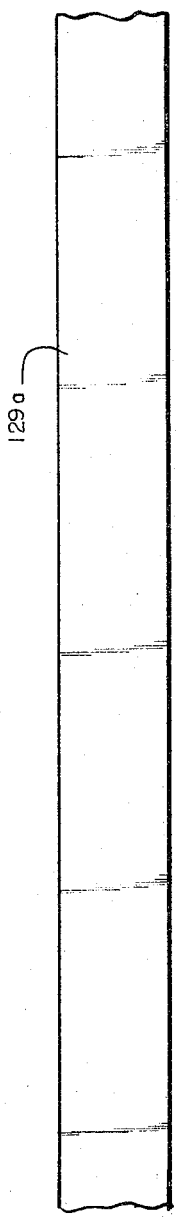

FIGURE 5 as used herein refers generically to FIGURES 5A, 5B, 5C, and 5D, as more fully explained in connection with FIGURE 7.

FIGURE 5A is a top view of part of the machine for making the joint of FIGURE 1.

FIGURE 5B is a top view of another part of the machine for making the joint of FIGURE 1.

FIGURE 5C is a top view of yet another part of the machine for making the joint of FIGURE 1.

FIGURE 5D is a top view of still another part of the machine for making the joint of FIGURE 1.

FIGURE 6 as used herein refers generically to FIGURES 6A, 6B, 6C, and 6D, as more fully explained in connection with FIGURE 7.

FIGURE 6A is a side view of part of the machine for making the joint of FIGURE 1.

FIGURE 6B is a side view of another part of the machine for making the joint of FIGURE 1.

FIGURE 6C is a side view of yet another part of the machine for making the joint of FIGURE 1.

FIGURE 6D is a side view of still another part of the machine for making the joint of FIGURE 1.

FIGURE 7 shows how sheets 2, 3, 4, 5, 6, 7, 8 and 9 are placed together in order to illustrate FIGURE 5 and 6 in their entirety.

Figure 8:
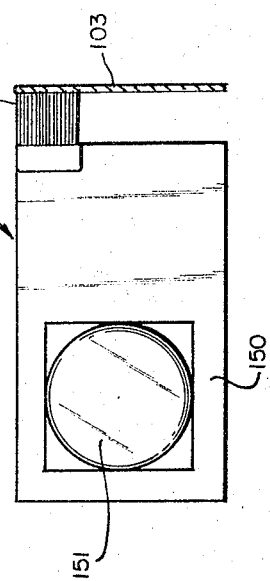

FIGURE 8 is a top view of the metal primer device 107 of FIGURE 6A.

Figure 9:
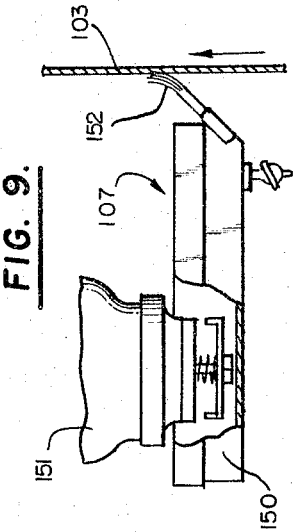

FIGURE 9 is a side view of the metal primer device 107 of FIGURE 6A.

Figure 10:
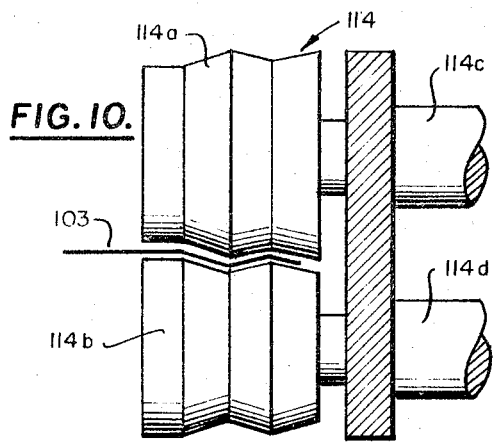

FIGURE 10 is a side view of the first forming roll 114, taken along line 10—10 of FIGURE 6.

Figure 11:
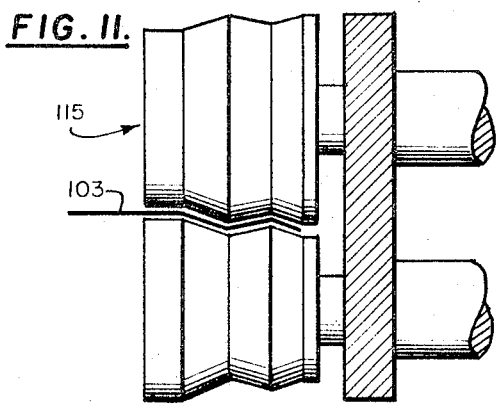

FIGURE 11 is a side view of the second forming roll 115 of FIGURE 6.

Figure 12:
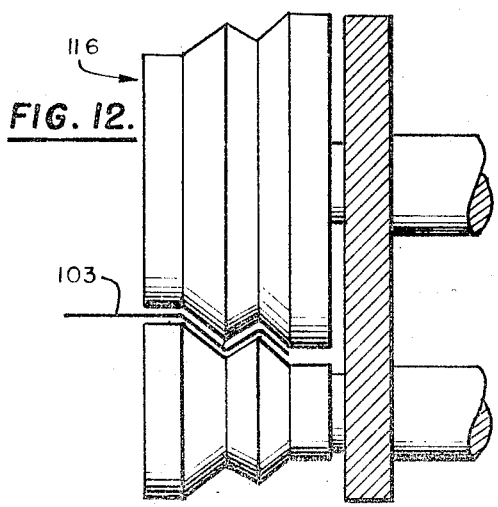

FIGURE 12 is a side view of the third forming roll 116 of FIGURE 6.

Figure 13:
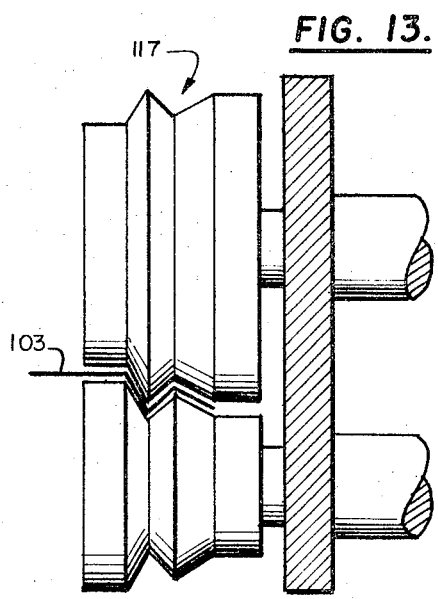

FIGURE 13 is a side view of the fourth forming roll 117 of FIGURE 6.

Figure 14:
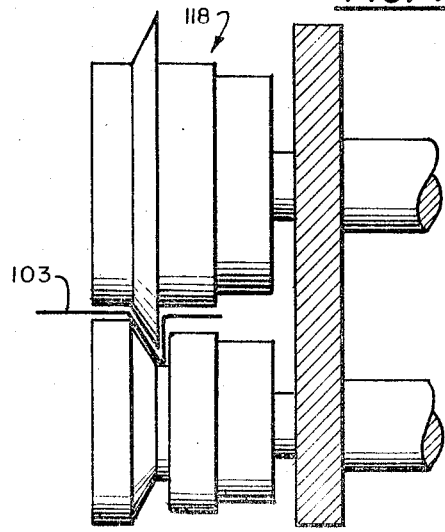

FIGURE 14 is a side view of the fifth forming roll 118 of FIGURE 6.

Figure 15:
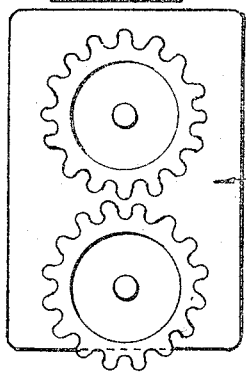

FIGURE 15 is a side view of the crimping wheels 124 of FIGURE 6.

Figure 15A:
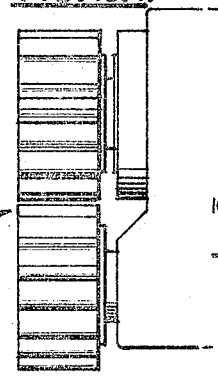

FIGURE 15A is an end view of the crimping wheels of FIGURE 15.

Figure 16:
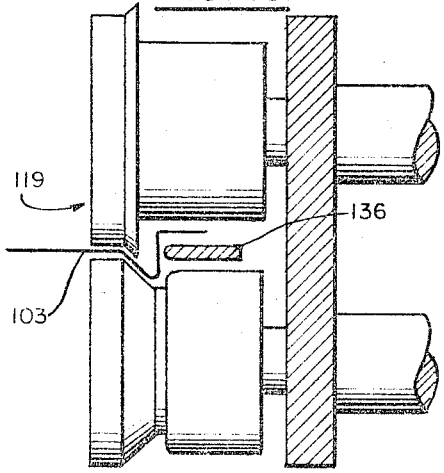

FIGURE 16 illustrates the first edging rolls 119, together with their wedge 136, of FIGURE 21.

Figure 17:
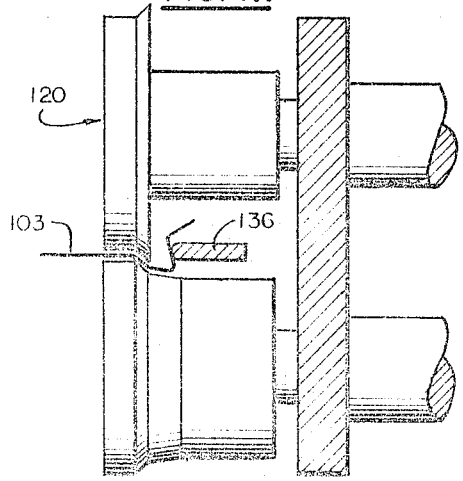

FIGURE 17 illustrates the second edging rolls 120, together with their wedge 136, of FIGURE 21.

Figure 18:
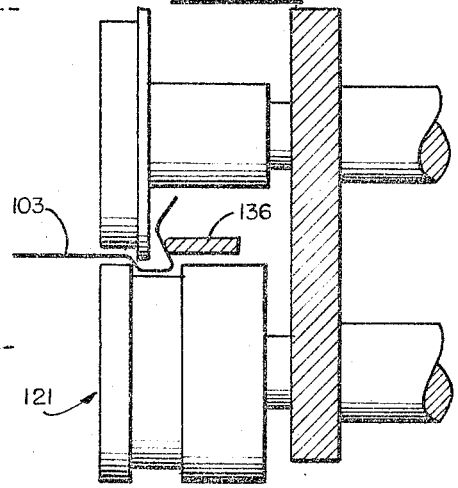

FIGURE 18 illustrates the third edging rolls 121, together with their wedge 136, of FIGURE 21.

Figure 19:
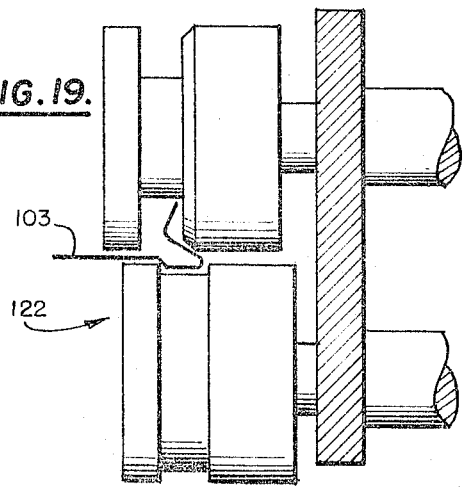

FIGURE 19 illustrates the first finishing rolls 122 of FIGURE 6.

Figure 20:
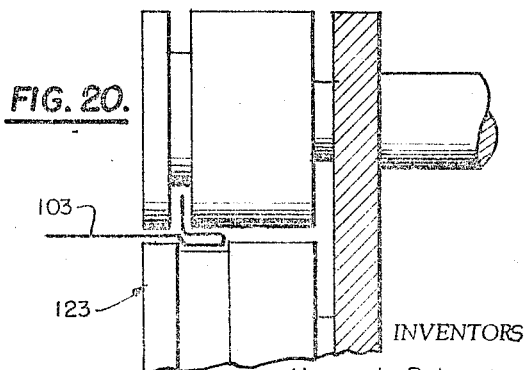

FIGURE 20 illustrates the second finishing rolls 123 of FIGURE 6.

FIGURE 21 is a side view of the wedge 136 of FIGURES 16, 17, 18.

FIGURE 22 is a top view of the wedge of FIGURE 21.

FIGURE 23 is an end view partly in section of the apparatus for applying adhesive to the elastomeric sheet 16.

FIGURE 24 is a cross-sectional view of FIGURE 23 taken along line 24—24.

FIGURE 25 is a cross-sectional view of the apparatus of FIGURE 23 taken along line 25—25.

FIGURE 26 is an end view of the appartus of FIGURE 23.

FIGURE 27 is a side view of the bonding device 131, together with the closing rolls 132 and the press rolls 133, all of FIGURE 6.

FIGURE 28 is a top view of the apparatus of FIGURE 27.

FIGURE 28A is a sectional view taken along line 28A—28A of FIGURE 28.

FIGURE 29 is a detail view of the bonding rolls 131 of FIGURE 6, and is a view along lines 29—29 of FIGURE 27, but with certain parts such as the vertical part of strip 16 omitted.

FIGURE 30 is a detail view of the closing rolls 132 of FIGURE 6.

FIGURE 31 is a plan view of the adhesive applicator 125 (together with associated apparatus) of FIGURES 5 and 6.

FIGURE 32 is a detail view of the adhesivt applicator per se of FIGURE 31.

FIGURE 33 is an end view of the squeegee rolls 222 of FIGURE 31.

FIGURE 34 is a side view of the device shown in FIGURE 33.

FIGURE 35 is a top view of four of the edging rolls together with the wedge.

FIGURE 36 is an end view of the apparatus of FIGURE 35.

The expansion joint cover of FIGURE 1 is described in detail in the aforesaid prior copending application. It comprises two metal sheets 10 and 12, preferably of copper or similar rust-resistant material, which are bent to form sockets into which the elastic material 16 fits and is preferably secured by means of a suitable adhesive. FIGURE 2 shows a cross-sectional view of FIGURE 1 and it is apparent that the metal strip 10 has the folded portions 22, 24 and 26 to form a socket between the members 24 and 26 to hold the end 18 of the elastic member 16. At the left end of FIGURE 2 it is noted that the elastic member 16 is clamped between the pieces of metal 20 and 23–25, the same as on the righthand side.

FIGURES 1 through 4 are diagrammatic only, it being understood that the elastic strip 16 is much wider in relation to the other parts than is shown. For example, strip 16 may be 5 inches while portion 20 may be ½ inch.

In use, the elastic joint of FIGURES 1 and 2 has its metal strips 10 and 12 respectively connected to two parts of a building or other structure which may move with reference to each other, and the elastic member 16 provides the necessary elasticity for expansion and contraction, all as described in our aforesaid prior copending application.

The present invention deals particularly with the machine for and method of manufacturing the expansion joint of FIGURES 1 and 2 and in that connection reference will be made particularly to FIGURES 3 and 4. In FIGURE 3 the elongated sheet of elastic material is shown in cross-sectional form at 16, and below it appears two strips 10 and 12 in a preliminary stage of their bending operation.

As shown in FIGURE 4, another step of the process includes lowering the strip 16 in the pocket created by strips 10 and 12, but only after the strips 10 and 12 have been coated with adhesive and dried on the faces which will contact the elastic material 16. The elastic material 16 is also coated with adhesive and dried on those portions which contact the strip portions 20, 23, 24 and 26.

Following the step shown in FIGURE 4, the two members 20 and 26 are then bent over the top of the elastic strip 16 (to produce the complete unit of FIGURE 2) and since the two members 20 and 26 are coated with adhesive they hold the elastic material 16 partly by reason of the clamping action of the strips but mainly because of the adhesive action.

There follows a description of the machine which carries out the process which has been very briefly described in connection with FIGURES 2, 3 and 4.

In order fully to understand the machine and the drawings, it is desirable to fit eight of the sheets of patent drawings together as more fully illustrated in FIGURE 7. FIGURE 5 comprises four subfigures, FIGURE 5A, FIGURE 5B, FIGURE 5C, and FIGURE 5D, which should be placed end to end in order to fit together and illustrate FIGURE 5 in its entirety as a single entity. Similarly, FIGURE 6, which is a side view of the machine, comprises four subfigures, FIGURE 6A, FIGURE 6B, FIGURE 6C and FIGURE 6D. The sheets of drawing containing these figures should be fitted together and placed directly under the corresponding drawings of FIGURE 5, because both FIGURE 5 and FIGURE 6 are to the same scale, and FIGURE 5, if properly aligned over FIGURE 6, shows a top view of the parts shown on FIGURE 6.

In order to provide information as to one size which our machine may take in a practical embodiment, we state: The length of the apparatus shown on FIGURE 6A is 16 feet, 6 inches; while the apparatus of FIGURES 6B, 6C and 6D is to a slightly smaller scale and the overall apparatus of all three of these subfigures is 50 feet.

Referring now to FIGURES 5 and 6, it is noted that at the start of the process there is a large coil of copper in strip form, this coil bearing reference numeral 101 in FIGURE 6A. Actually there are two coils of this strip material as shown in FIGURE 5, one of which is the coil 101a for supplying the copper strip which ends up as the strip 12 of FIGURE 2. The coil 101b supplies the strip which ends up as the strip 10 of FIGURE 2. Each coil 100 of copper strip material has a suitable means 102 for adjusting the drag, and the copper strip emerges from the coil at 103 where it passes a guide 104 and is subjected to cleaning by the wire brush 106 after it has had its direction changed by the wheel 105. Each wire brush 106 only brushes about one inch of the strip adjacent the inner edge of the five inch strip 103. The one-inch portions subject to brushing are the portions 20–23 and 24–26 (FIGURE 4) to which adhesive is later applied. The copper strip after being brushed passes upwardly past the coating machine 107 which applies a primer coat to the copper strip and then past the infra-red lamps 108 for drying the primer coat, thence over the idler wheel 109, next over the idler wheel 110, and finally over the idler wheels 112 and 111. The idler wheels 110, 111, and 112 are provided in substantially spaced relation, as shown, to provide additional time for the primer fully to dry before the next step of the process. Suitable additional guides such as 104a may be used where needed. The copper strip next passes the lubricating device 113 where it is given a suitable coating of wax, oil, or other solvent preparatory to the bending operations which will next be described.

Lubrication is applied for the well known purpose of enabling the forming rolls to slip with reference to the strip as the latter passes the rolls. Concurrently with application of the lubricant, the strips are guided in conventional manner by the guides 143 which may be adjusted transversely by cranks 144.

The copper strip passes through forming rolls 114 to 123 inclusive, including the intermediate crimping device 124. These forming rolls as well as the crimping device are fully shown in detail in connection with FIGURES 10 to 20, to be described later. It is sufficient at this stage to point out that after each copper strip (101a and 101b) has passed its respective set of rolls, it has been bent to the shape illustrated for parts 12–20 and 10–26 of FIGURE 3, as will appear later.

After leaving the finishing rolls 123, each strip 101a and 101b then pases through the metal guider and coater 125 which applies a suitable contact cement or other adhesive to those particular surfaces of the metal which will subsequently come in contact with the elastic material 16 (FIGURE 3). An example of suitable elastic materials, contact cement, drying details, etc., are all covered in Military Specification 15,058–D (Types 3 and 4). In other words, referring to FIGURE 3, the portions of the metal strips 10 and 12 which will be coated with adhesive will include the lefthand face of strip 26 and the upper face of strip 24; and the corresponding faces 20 and 23 of the element 12.

After the coated strips leave the element 125, they pass under the hot air outlets 126 where they are subjected to a suitable blast of hot air for the purpose of partially drying the contact cement, and following this they pass through the air at room temperature, for a considerable distance, allowing the adhesive to further partially dry. Hot air is supplied to outlets 126 from a main hot air duct 126a.

While the aforesaid operations have been taking place, the supply roll of elastic material 127 (see FIGURE 6A) has been feeding a strip of elastic material 16 past a coating device 128 which coats limited portions near the opposite edges with adhesive, following which the coated elastic strip 16 passes between the hot air outlets 129 so that the contact cement will partially dry. These outlets are fed by main hot air ducts 129a.

After leaving the hot air outlets 129, the coated elastic strip 16 passes over a pulley 130 and is directed toward the bonding machine 131. At this stage, the machine and method have brought the elastic strip 16 and the two metal strips 10 and 12 into the relationship shown in FIGURE 3, namely, the elastic strip is above the open pocket made up by the strips 10 and 12. The two faces of the strip 16, at least adjacent their opposite edges, have been coated with a suitable contact cement which has been partially dried, and similarly the strips 10 and 12 have been coated with contact cement which is partially dry on those surfaces which will contact the elastic strip 16. The bonding machine 131 will cause the elastic strip 16 physically to enter into the pocket in members 10 and 12, as shown in FIGURE 4, and thereafter the bonding rolls 132, together with the press rolls 133, 134, and 135, will clamp the members 20 and 26 onto the top of the elastic strip 16 to produce the product of FIGURE 2.

FIGURES 8 and 9 illustrate the details of the primer coating device 107 of FIGURE 6. This primer coating device 107 simply comprises a pan 150 which is filled with a primer to a given level in any well-known manner, as by means of a bottle 151, and employs a brush 152 which feeds the primer by capillary action onto the strip 103 as it passes the same.

The first set of rolls 114 of FIGURE 6 is shown in detail in FIGURE 10 where two forming rolls 114a and 114b form the strip 103 to the shape shown. Said rolls are driven by shafts 114c and 114d.

In each of the sets of forming rolls hereinafter described, there are shafts corresponding in function to shafts 114c and 114d, and since they have been described in connection with FIGURE 10, they will not be described in connection with the other figures.

The forming rolls 115 of FIGURE 11, the forming rolls 116 of FIGURE 12, the forming rolls 117 of FIGURE 13 and the forming rolls 118 of FIGURE 14, apply progressively sharper bends to the strips 103 as shown.

Following forming rolls 118, each strip next passes through the crimping machine of FIGURE 15, however, the crimping operation is optional and may be omitted. The crimping machine comprises two spaced gear wheels positioned to apply crimping along the horizontal portion of the strips which later will become the portions 20 and 26 of FIGURE 3.

The edging rolls 119 (FIG. 16), 120 (FIG. 17), and 121 (FIG. 18), together with a suitable wedge 136, bend the strip 103 progressively as shown; and the finishing rolls 122 (FIG. 19) and 123 (FIG. 20) effect the final bending operations preparatory to receiving the elastic material 16. The shape of the strip 103, when it is ready to receive the elastic material 16, is as shown in FIGS. 3 and 20; however, FIG. 3 shows the strip more accurately than FIG. 20 because the gap between portions 23 and 25 is fully closed.

The wedge 136 is shown in more detail in FIGS. 21, 22, 35 and 36. The leading end (shown at the righthand end of FIGS. 21, 22, 35 and 36) of the wedge starts between the two edging rolls 119 of FIGS. 16 and 36. The wedge 136 continues and passes between the second set of edging rolls 120 of FIGS. 17, 35 and 36, and between the third set of edging rolls 121 of FIGS. 36 and 35, and it has a flange 136a located between rolls 121 (FIGS. 18, 35 and 36) and 122 (FIGS. 19, 35 and 36) to insure that the strip 103 is bent to the desired shape shown.

The finishing rolls 122 and 123 of FIGS. 19 and 20 respectively accomplish the final bending operations to the shape shown in FIG. 20 (more accurately shown in FIG. 3 as explained above).

While our invention includes as one element means for binding the metal strips 10 and 12 to the shape shown in FIG. 3, it is obvious to those skilled in the art of machinery for bending and forming strips how to do this with rolls and wedges, and we do not claim that the specific details of the rolls and wedges 114–123 and 136 are part of our invention; but we do claim a larger machine in which any suitable means for performing the function of these rolls and wedges is an element of the combination.

FIGURE 23, together with detailed FIGURES 24 and 25, illustrate the details of the coating machine 128 of FIGURE 6. The sheet of elastic material 16 from the roll 127 has limited surface portions adjacent its opposite edges passing between rollers 161 and 164. The lower portions of the two rolls 161 pass through adhesive pans 170 where contact cement of any suitable type is picked up and fed into contact with limited portions of the lower surfaces of the sheet 16. In order to properly align the sheet 16 with the rolls, a pair of control rings 162 are positioned adjacent the rolls 161 and have slightly larger diameter than the rolls 161, whereby the sheet 16 must remain between the two rings 162.

In order to coat limited portions of the upper surfaces of the strip 16, adhesive must be transferred from the pans 170 to the rollers 164. This is done by means of the pick-up rings 166.

In order to regulate the quantity of adhesive fed to the upper and lower surfaces of the strip 16, the scraping devices 167 and 168 are employed in connection with the pickup ring 166 and the rolls 161. The scrapers 167 and 168 are located in a horizontal plane above the adhesive pan 170 as shown in FIGURE 23, and have a detailed construction as shown in FIGURES 24 and 25. The scrapers 167 and 168 are positioned very close to, but not in actual contact with their respective rings 166 and rolls 161 so that only a limited amount of adhesive may be picked up and transmitted to the sheet 16. In order to prevent the adhesive from contacting portions of the sheet outside of the limited portions desired, the rolls 161 and 164 have flanges 165 which pinch the sheet and prevent travel of cement past the pinched area.

Rollers 161 and 164 are respectively driven by shafts 173 and 174. The two shafts 173 and 174 are supported at their outer ends by bearings 173a and 174a and near their inner ends by bearings 180 and 181. Bearings 180 are fixed in position whereby shaft 173 always rotates around a fixed axis while bearings 181 may move up and down between guides 182 (FIGURE 25). Springs 175 bias the bearing downwardly. Bearings 174a pivot around the screws 163 to a limited extent so as to adjust automatically the relative position of rolls 164 for sheets 16 of different thicknesses. Bearing 174a has holes 183 to receive pivots 163. The supports 184 and 185 are of fixed position.

The sheet 16 is prevented from sagging in the middle by means of a suitable support together with rollers 169.

As many sets of supports and rollers 169 as are required for suitable support of sheet 16 may be used.

The bonding apparatus 131 of FIGURE 6D is shown in more detail in FIGURES 27 and 28 where the elastic strip 16 is shown approaching the main bonding wheel 200 and the copper strips 10 and 12 are shown approaching the bonding area through the guides 205. As shown in FIGURE 27, the elastic strip 16 is now guided by the rolls 200 onto the strips 10 and 12, under pressure which results from the fact that bonding rolls 200 and 204 are pressed toward each other. The top roll 200 is adjustable in a vertical direction to take into account different thicknesses of the strip 16 and of the strips 10 and 12. The lower roll 204 comprises two separate parts, roll 204a which rotates in a fixed vertical plane, and roll 204b which rotates in a vertical plane which may be adjusted sidewise to taken into account variations in the width of strip 16. The two rolls 200 may be adjusted toward or away from each other to accommodate different widths of the strip 16.

The guides 206 are spring steel flat plates that separate the strip 16 and the portions 20 and 26 of the metal strips (see FIGURE 3) so that during the bonding operation no part of the strip 16 can contact the portions 20 and 26 but can only contact the portions 23 and 24.

After leaving the bonding rolls 200 and 204, the strips 10, 12 and 16 pass through the guides 201a, 201b, 201c and 201d, shown in more detail in FIGURES 28 and 28A. The two guides 201a and 201b are shown in plan view in FIGURE 28 and in cross-section in FIGURE 28A. In the plan view, it is noted that guide 201a, while adapted for adjustment by means of bolt 203, is actually maintained in a fixed position while the guide 201b may be adjusted to increase or decrease the space between the guides by loosening bolt 202. After the adjustment has been effected, bolt 202 is again tightened. Guide 201c may be fastened to guide 201a and move with it; and guide 201d may be fastened to guide 201b and move with it. FIGURE 28 also shows that the bonding rolls 200 have suitable bearings 200a. After leaving the guide 201 the strips 10, 12 and 16 are fed to the closing rolls 132 which are shown generally in FIGURES 6, 27 and 28, but are shown in detail in FIGURE 30. These rolls have a tapered upper section 210 for bending the vertical portions 10v and 12v of the metal strips toward a horizontal position. After leaving the closing rolls, the strips 10, 12 and 16 pass through the pressing rolls 133, 134 and 135 (FIGURE 6). Since these rolls are identical, only the first one 133 has been shown in FIGURES 27 and 28, but it is understood that two additional rolls follow 133 as is shown more fully in FIGURE 6.

As was explained in connection with FIGURE 20, the portions 23–25 and 24–26 of the metal strips are in contact with each other as shown in FIGURE 3, and the showing of these strips with a slight separation in FIGURES 20, 28A, 29 and 30 is only diagrammatic.

The press rolls 133, 134 and 135 are simply standard cylindrical rolls which squeeze the joint between the metal portions 20 and 23 and the elastic strip 16 (see FIGURE 3) with suitable pressure.

The apparatus 125 (FIGURE 6A) for applying the adhesive to the metal strips is shown in more detail in FIGURES 31, 32, 33, 34 and 35. The metal strips pass rolls 123 and at this stage the metal strips 10 and 12 have the shape shown in FIGURES 20, 28A and 29, and therefore they have the vertical portions 10v and 12v which pass between guide rolls 221 before they reach the adhesive applicator 223. The guide rolls 221 may be adjusted in a horizontal plane by means of cranks 221a to insure that the two strips 10v and 12v thereafter proceed in parallel planes. Applicator 223 is fed by adhesive through pipe 224 which has a pipe 225 connecting the same to a source of adhesive under pressure. Each applicator 223 has three small orifices which direct jets of adhesive onto the strips.

The applicator 223 applies adhesive to all of the portions of the strips 10 and 12 which will subsequently contact the elastic strip 16. After the adhesive has been applied, the metal strips pass the squeegee rolls 222 which have cloth covering 223, for the purpose of insuring that the adhesive is applied uniformly to the strips. The movement of the metal strips 10 and 12 rotates roll 222.

The strips 10 and 12 may be of any suitable metal or plastic including but without limitation galvanized iron, stainless steel, monel metal, aluminum, etc. Additional examples of material that may be used for strip 16 are set forth in our aforesaid prior copending application.

In the claims, the portion 22 of strip 10 is sometimes referred to as the "first portion" of the strip, while portion 24 is sometimes referred to as the "second portion" and the portion 26 is sometimes referred to as the "third portion." Similar terminology applies to the corresponding portions of strip 12.

What is claimed is:

1. The method of making an elastic joint member comprising forming two strips each strip having a first integral portion with a superimposed second integral middle portion bent back over a part of the first portion and each strip having a third integral portion extending transverse to the second portion in a direction away from the first portion, positioning said strips with said third portions facing each other and with the two second portions forming a platform between the third portions, positioning a strip of elastic material on said platform, and bending the third portion onto the elastic material to clamp the elastic material between the second and third portions.

2. The method of making an elastic joint member comprising bending a limited third portion adjacent one edge of each of two strips to form a transverse flange, folding a further limited second portion of each strip adjacent said third portion onto a portion of the remainder of the strip, guiding the two bent and folded strips into bonding position wherein the second portions are spaced from each other in a common plane between the third portions, feeding elastic strip material onto said second portions, and bending the third portions onto the elastic strip material to clamp the latter between the second and third portions of said strips.

3. The method of claim 2 which includes applying adhesive to at least some of the surfaces of the elastic material before they are clamped between the portions of the strips.

4. The method of claim 2 which includes applying adhesive to at least some of the surfaces of the strips which will contact the elastic material before clamping the elastic material between the strips.

References Cited by the Examiner

UNITED STATES PATENTS

| 2,041,004 | 5/1936 | Levan | 29—505 |
| 2,475,112 | 7/1949 | Stanitz | 29—470.5 |
| 2,825,384 | 3/1958 | Goldsmith | 29—505 |
| 3,015,293 | 1/1962 | Parham | 113—54 |
| 3,060,991 | 10/1962 | Chausson | 29—208 |
| 3,174,210 | 3/1965 | Margulus | 29—417 |
| 3,226,817 | 1/1966 | Simborg et al. | 29—430 |

References Cited by the Applicant

FOREIGN PATENTS

| 605,702 | 10/1962 | Canada. |
| 657,403 | 2/1963 | Canada. |

JOHN F. CAMPBELL, *Primary Examiner.*

THOMAS H. EAGER, *Examiner.*